United States Patent [19]

Aylmore

[11] Patent Number: 5,783,066

[45] Date of Patent: Jul. 21, 1998

[54] PLASTICS ARTICLES

[75] Inventor: Peter Roger Aylmore, Gloucestershire, Great Britain

[73] Assignee: Landbrent Limited, Witney, United Kingdom

[21] Appl. No.: 751,568

[22] Filed: Nov. 18, 1996

Related U.S. Application Data

[63] Continuation of Ser. No. 428,083, filed as PCT/GB94/01881 Aug. 30, 1994, published as WO94/26086, Nov. 24, 1994., abandoned.

[30] Foreign Application Priority Data

Aug. 28, 1993 [GB] United Kingdom .................. 9317967

[51] Int. Cl.⁶ .................. C02F 3/10; B29B 9/06
[52] U.S. Cl. .................. 210/150; 210/263; 210/500.1; 264/148; 264/177.16; 428/402
[58] Field of Search .................. 210/150, 151, 210/263, 500.1, 502.1; 264/45.9, 122, 142, 148, 177.16, 178 R; 428/402

[56] References Cited

U.S. PATENT DOCUMENTS

| | | | |
|---|---|---|---|
| 4,294,638 | 10/1981 | Rasmussen | 264/49 |
| 5,055,186 | 10/1991 | Van Toever | 210/150 |
| 5,126,042 | 6/1992 | Malone | 210/150 |

FOREIGN PATENT DOCUMENTS

| | | |
|---|---|---|
| 0 302 621 | 2/1989 | European Pat. Off. . |
| 56-016580 | 2/1981 | Japan . |
| 59-152808 | 8/1984 | Japan . |
| 974045 | 11/1964 | United Kingdom . |
| 1102072 | 2/1968 | United Kingdom . |
| 1 202 002 | 8/1970 | United Kingdom . |
| WO 91/18658 | 12/1991 | WIPO . |
| WO 93/01137 | 1/1993 | WIPO . |

*Primary Examiner*—Ivars Cintins
*Attorney, Agent, or Firm*—Young & Thompson

[57] ABSTRACT

A pellet formed from a mix of two polymer materials which are non-homogenous is extruded through a die to form a highly roughened surface creating an enhanced melt fracture appearance. The extrusion is chopped into pellet form to provide a large surface area pellet to be used as a harbour for biomass in water treatment processes. Large quantities of such pellets in a filter provide a very effective filtration effect, largely because the highly roughened surface provides an enormous number of cavities within which the biomass can be retained.

19 Claims, 1 Drawing Sheet

PLASTICS ARTICLES

This application is a continuation of application Ser. No. 08/428,083, filed as PCT/GB94/01881, Aug. 30, 1994 published as WO94/26086, Nov. 24, 1994, now abandoned.

BACKGROUND OF THE INVENTION

One method of treating water (such as sewage) is to pass it through a filter which incorporates a large quantity of pellets or similar items so that the water passes through the cavities left between the pellets. The filtration system depends upon the presence of bacterial growth which will be provided on the pellets in the form of a biomass which acts to break down the sewage in the water. The pellets need to pack down well so as to create convoluted filtration pathways. It is also essential that the filter media should be capable of retaining the biomass on the pellets whilst water and/or air is being forced through (often with violent agitation), since the effectiveness of the filtration plant depends upon the quantity of biomass present. Cleaning of the filtration plant is often a problem and results in a loss of a substantial proportion of the biomass which then has to be regrown.

SUMMARY OF THE INVENTION

According to the present invention there is provided a pellet for use in quantity in a filter of a water treatment plant and comprising a mix of two polymer materials which are non-homogenous extruded through a die to form a highly roughened surface creating an enhanced melt fracture appearance and then chopped into pellet form to provide a large surface area pellet to be used as a harbour for biomass in water treatment processes.

Such a pellet is ideally suited for use in a filter for a water treatment plant, largely because the highly roughened surface created by the enhanced melt fracture appearance provides an enormous number of cavities within which the biomass can be retained. The preferred forms of polymers in the polymer mix are polyolefins, preferably polypropylene or polyethylene. Styrenes, polyesters, for example PET (polyethyleneterephtalate), or polyvinylchloride are further possibilities.

Ideally additives will be incorporated into the basic polymer mix in the form of cross-linked, restructured and/or high molecular weight polyolefin material, which will help to enhance the melt fracture appearance.

In order to achieve a desired density for the pellet the polymer mix can incorporate mineral, organic or inorganic filler. It is also possible to reduce the density of the material by introducing gas into the material by injection or by incorporating a blowing agent or other basic ingredient (during formation) which will vaporise when heated or which will cause an expansion effect. By this means pellets could be formed which will tend to float on the surface of the water being treated. In other situations it may be desirable for the pellets to be of slightly greater density than the water. The pellet size will preferably lie within the range of a diameter of 2 to 8 mm and a length of 2 to 8 mm.

The pellets will ideally be formed by forcing them through a restricted die whose shape is such that the material will not tend to flow smoothly through the die, resulting in a non-symmetrical roughness on the pellet surface.

Thus, according to a further aspect of this invention there is provided a method of forming pellets for use in water treatment plants, wherein a mix of two polymer materials which are non-homogenous is extruded through a die aperture under pressure, the aperture having a restricting land leading to a swell opening such that the material, after being subjected to an abrupt restriction step, is enabled to expand rapidly upon ejection from the die, the extrusion being chopped into lengths to form the pellets.

Depending upon the size of the pellets to be formed (and thus for larger sizes), the swell opening can comprise a section of the die aperture of larger cross-section than and downstream of the land. For smaller pellet sizes the exit point from the land can comprise both the swell opening and the exit point from the die. The pressure changes caused by the land and the swell opening result in substantial stresses being created in the polymer mix material leading to separation and lamination. Cooling at the exit point from the die will ideally be by cutting the pellets immediately upon extrusion and cooling in a torrent of water, or feeding the extrusion through a water cooling bath, followed by chopping into pellets. Violent stress cracking occurs on the outer surface of the pellet at the exit point from the die and rapid cooling causes this to be "frozen" in the final pellet.

Whilst certain materials would tend to be free running at high temperature through the die, the material for the pellets of this invention tends to create a frictional effect, particularly when additives are incorporated. Preferred additives for this purpose, to be incorporated into the basic polymer mix are cross-linked, restructured and/or high molecular-weight polyolefin material, which will help to enhance the melt fracture appearance. Ideally, the base polymer mix material will constitute 80%, preferably 90% or more of the total product.

The invention further extends to a treatment plant for water (or other aqueous liquid) incorporating a container filled to a predetermined level with pellets of this invention as hereinbefore defined and provided with means for passing the liquid through the container and thus through the bed of pellets.

BRIEF DESCRIPTION OF THE DRAWINGS

The invention may be performed in various ways and a preferred embodiment will now be described, by way of example, with reference to the accompanying drawings, in which.

DETAILED DESCRIPTION OF THE INVENTION

Figure 1:
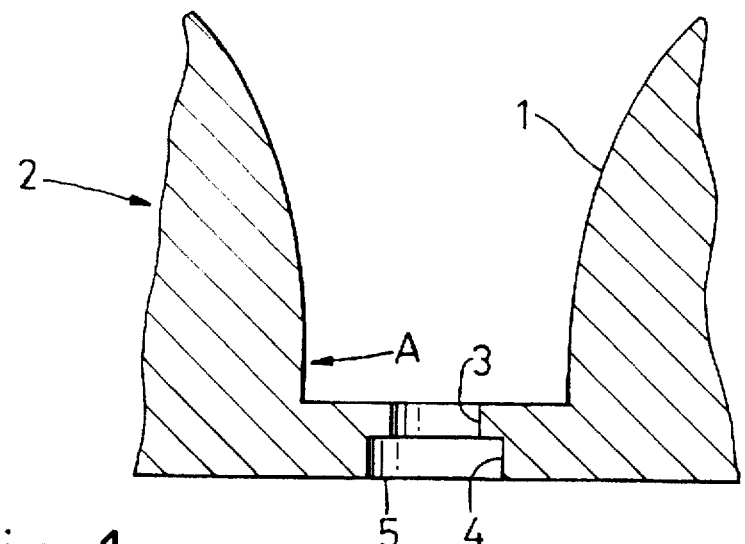
FIG. 1 is a sectional view through part of a die used in creating pellets of this invention.

In forming pellets of this invention, a polypropylene or polyethylene mix of non-homogenous parts is heated to a molten state. A suitable mixture would be about 60% polyethylene together with about 40% of cross linked polyethylene and a small amount (say ½%) of polyvinylchloride. The latter ingredient does not mix at all with the other two and also decomposes to create gas which enhances the irregular surface effect in the final product. The molten mix is forced under high pressure through an outlet section 1 of a die 2 and is subjected to rapid constriction at a land region 3. Typically, the die diameter at point A might be 5 mm, reducing to 2.25 mm at the land 3. A swell opening 4 is provided immediately after the land 3 (at a diameter of 2.50 mm), thus enabling the material to expand again to some extent before it is finally ejected through an outlet opening 5 where further expansion occurs accompanied by rapid cooling with water. AS a result of the passage of the material through the die the material is subject to substantial stresses and physical reconstruction at the regions 3 and 4 of the die and as the material is ejected from the die. This creates a highly roughened surface to the material, as can be seen from the representation of a pellet illustrated in FIG. 3. The material extruded from the die is immediately chopped into pellet lengths after ejection from the die.

Figure 2:
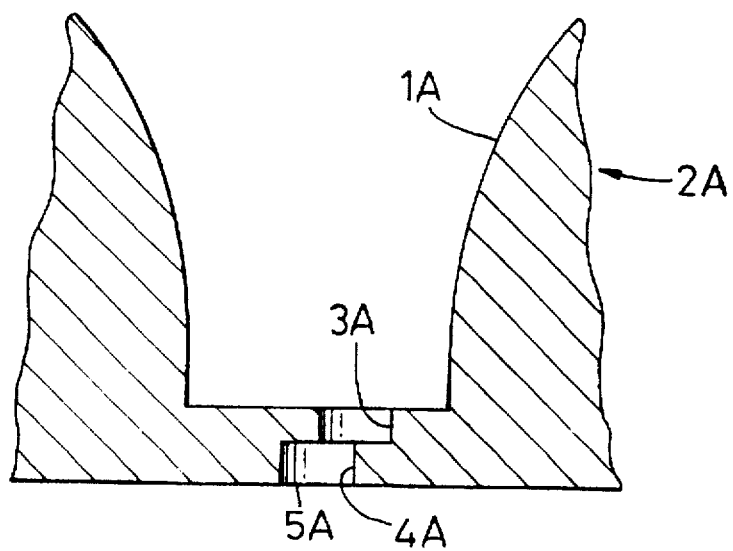
FIG. 2 is a part section view of an alternative die used for this purpose.
Figure 1:
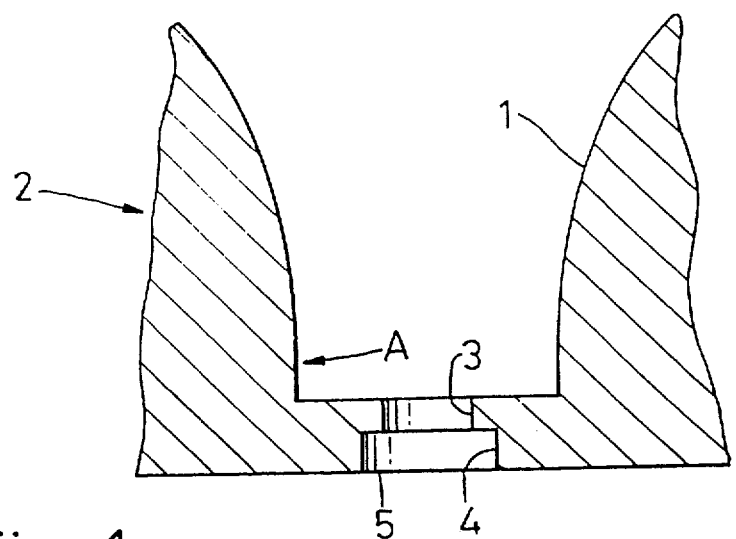
Figure 3:
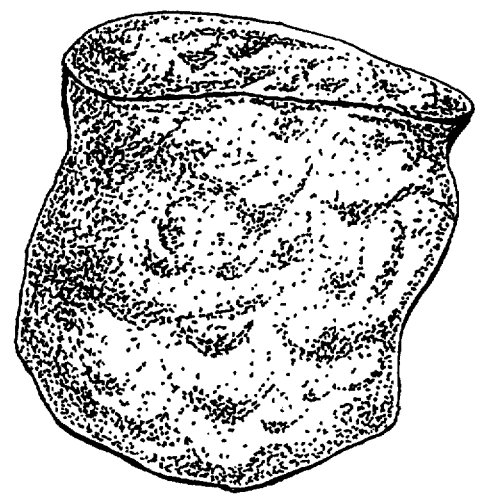
Figure 2:
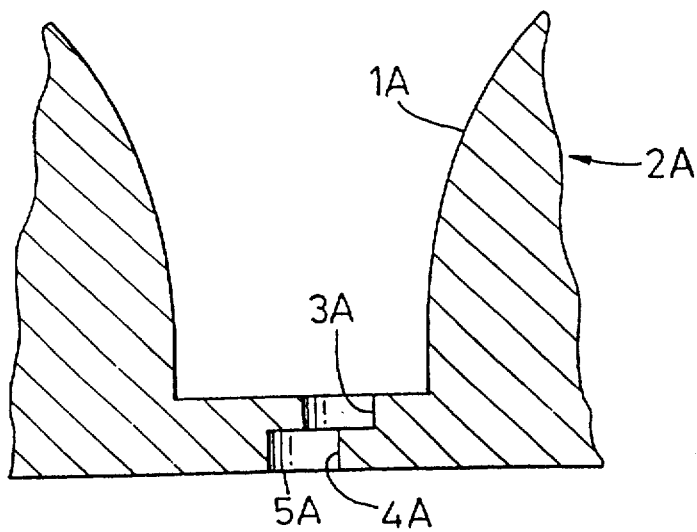

FIG. 2 shows an alternative form of die design where the swell portion 4A is displaced to one side from the land region 3A of the die 2A. Both regions 3A and 4A have a diameter of 2.50 mm, but the displacement causes somewhat similar stresses on the material, as it leaves the land region 3A, as are experienced in the die of FIG. 1. For pellets of small diameter sizes the swell region and the exit point (4 and 5) can be combined so that the exit from the die is effectively at the end of the land region 3.

Figure 3:
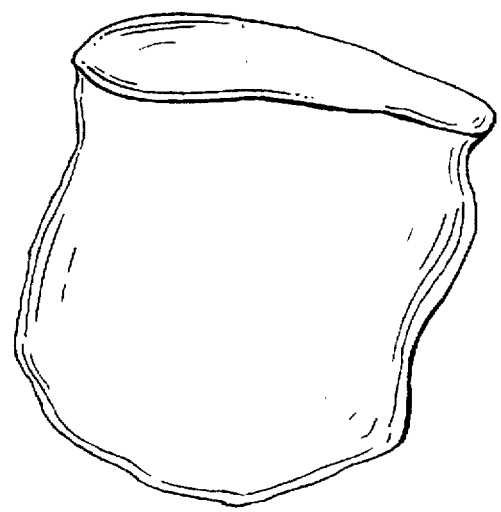
FIG. 3 is an enlarged illustration of a pellet formed by using the die shown in FIG. 1.

A substantial quantity of pellets, such as those illustrated in FIG. 3, will be held within a container having an inlet and an outlet for a aqueous liquid (for example sewage) such that the liquid can be pumped through the bed of pellets so as to achieve a high filtration effect. The pellets will have been pre-treated, if necessary, to promote bacterial growth on the pellets surface to provide a biomass which will act on organic impurities in the liquid.

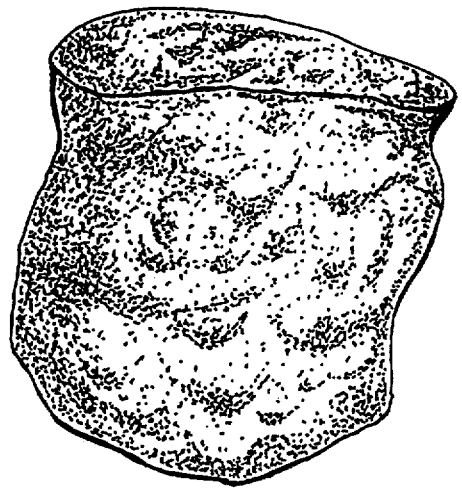

I claim:

1. A pellet for use in quantity in a filter of a water treatment plant and comprising a mix of two polymer materials which are non-homogenous to one another and have been extruded through a die to form a roughened surface creating a melt fracture appearance and then chopped into pellet form to provide a large surface area pellet of solid form, to be used as a harbour for biomass in water treatment processes.

2. A pellet according to claim 1, wherein the polymers in the polymer mix are two polymers selected from a styrene, polyesters, polyolefin, polypropylene or polyethylene.

3. A pellet according to claim 1, wherein said mix of two polymer materials includes additives, the additives comprising cross-linked, restructured and/or high molecular weight material.

4. A pellet according to claim 3, wherein said mix of two materials constitutes 80% of the total product.

5. A pellet according to claim 3, wherein said mix of two polymer materials constitutes at least 90% of the total product.

6. A pellet according to claim 1, wherein the polymer mix incorporates a mineral, organic or inorganic filler.

7. A pellet according to claim 1, wherein the pellets are of greater density than the water.

8. A pellet according to claim 1, wherein the pellets are of lower density than the water.

9. A pellet according to claim 1, wherein the pellet size lies within the range of a diameter of 2 to 8 mm and a length of 2 to 8 mm.

10. A pellet according to claim 1, wherein the extruded material includes gas voids.

11. A method of forming pellets for use in water treatment plants, wherein two polymer materials which are non-homogenous to one another are extruded through a die aperture under pressure, to create a mix of the two materials, the aperture is formed with a restricting land leading to a swell opening, the mix of materials is subjected to an abrupt restriction at the restricting land, then expands rapidly upon ejection from the die into the swell opening and the extrusion so formed is chopped into lengths to form the pellets.

12. A method according to claim 11, wherein the swell opening comprises a section of the die aperture of larger cross-section than and downstream of the land.

13. A method according to claim 11, wherein the exit point from the land comprises both the swell opening and the exit point from the die.

14. A method according to claim 11, wherein the extrusion is cooled at the exit point from the die by cutting the pellets immediately upon extrusion and cooling in a torrent of water.

15. A pellet as formed by the method of any of claim 11.

16. A method according to claim 11, wherein the extrusion is cooled at the exit point from the die by feeding the extrusion through a water cooling bath, and the extrusion is then chopped.

17. A method according to claim 11, wherein a density reduction of the material is achieved by injecting gas into said mix of two materials or by incorporating into said mix of two materials a blowing agent which vaporizes when heated or causes an expansion effect.

18. A method according to claim 11, wherein the pellets are formed by forcing said mix of two materials through a restricted die whose shape is such that the material will not tend to flow smoothly through the die, resulting in a non-symmetrical roughness on the surface of the extrusion and the subsequently formed pellets.

19. A treatment plant for aqueous liquid comprising: a container filled to a predetermined level with a bed of pellets, wherein each pellet comprises a mix of two polymer materials which are non-homogenous to one another and have been extruded through a die to form a roughened surface creating melt fracture appearance and then chopped into pellet form to provide a large surface area pellet of solid form to be used as a harbor for biomass in water treatment processes, the plant also being provided with means for passing the liquid through the container and thus through the bed of pellets.

* * * * *

UNITED STATES PATENT AND TRADEMARK OFFICE
CERTIFICATE OF CORRECTION

PATENT NO. : 5,783,066
DATED : July 21, 1998
INVENTOR(S) : Peter Roger Aylmore

It is certified that error appears in the above-identified patent and that said Letters Patent is hereby corrected as shown below:

The title page, showing an illustrative figure, should be deleted and substitute therefor the attached title page.

Delete Drawing Sheet 1 and substitute therefor the Drawing Sheet consisting of FIGS. 1-3, as shown on the attached page.

Signed and Sealed this

Tenth Day of November 1998

Attest:

BRUCE LEHMAN

*Attesting Officer*  *Commissioner of Patents and Trademarks*

United States Patent [19]

Aylmore

[11] Patent Number: 5,783,066
[45] Date of Patent: Jul. 21, 1998

[54] PLASTICS ARTICLES

[75] Inventor: Peter Roger Aylmore, Gloucestershire, Great Britain

[73] Assignee: Landbrent Limited, Witney, United Kingdom

[21] Appl. No.: 751,568

[22] Filed: Nov. 18, 1996

Related U.S. Application Data

[63] Continuation of Ser. No. 428,083, filed as PCT/GB94/01881 Aug. 30, 1994, published as WO94/26086, Nov. 24, 1994., abandoned.

[30]  Foreign Application Priority Data

Aug. 28, 1993 [GB]  United Kingdom ............... 9317967

[51] Int. Cl.$^6$ ........................... C02F 3/10; B29B 9/06
[52] U.S. Cl. ................. 210/150; 210/263; 210/500.1; 264/148; 264/177.16; 428/402
[58] Field of Search ........................ 210/150, 151, 210/263, 500.1, 502.1; 264/45.9, 122, 142, 148, 177.16, 178 R; 428/402

[56]  References Cited

U.S. PATENT DOCUMENTS

| | | |
|---|---|---|
| 4,294,638 | 10/1981 | Rasmussen ............... 264/49 |
| 5,055,186 | 10/1991 | Van Toever ............... 210/150 |
| 5,126,042 | 6/1992 | Malone ............... 210/150 |

FOREIGN PATENT DOCUMENTS

| | | |
|---|---|---|
| 0 302 621 | 2/1989 | European Pat. Off. |
| 56-016580 | 2/1981 | Japan . |
| 59-152808 | 8/1984 | Japan . |
| 974045 | 11/1964 | United Kingdom . |
| 1102072 | 2/1968 | United Kingdom . |
| 1 202 002 | 8/1970 | United Kingdom . |
| WO 91/18658 | 12/1991 | WIPO . |
| WO 93/01137 | 1/1993 | WIPO . |

*Primary Examiner*—Ivars Cintins
*Attorney, Agent, or Firm*—Young & Thompson

[57]  ABSTRACT

A pellet formed from a mix of two polymer materials which are non-homogenous is extruded through a die to form a highly roughened surface creating an enhanced melt fracture appearance. The extrusion is chopped into pellet form to provide a large surface area pellet to be used as a harbour for biomass in water treatment processes. Large quantities of such pellets in a filter provide a very effective filtration effect, largely because the highly roughened surface provides an enormous number of cavities within which the biomass can be retained.

19 Claims, 1 Drawing Sheet